(12) United States Patent
Lynam (10) Patent No.: US 8,576,117 B2
(45) Date of Patent: Nov. 5, 2013

(54) RADAR APPARATUS

(75) Inventor: David Lynam, Watford (GB)

(73) Assignee: MBDA UK Limited, Hertfordshire (GB)

( * ) Notice: Subject to any disclaimer, the term of this patent is extended or adjusted under 35 U.S.C. 154(b) by 369 days.

(21) Appl. No.: 13/057,915

(22) PCT Filed: May 7, 2010

(86) PCT No.: PCT/GB2010/050742
§ 371 (c)(1),
(2), (4) Date: Feb. 7, 2011

(87) PCT Pub. No.: WO2010/128330
PCT Pub. Date: Nov. 11, 2010

(65) Prior Publication Data
US 2011/0140953 A1   Jun. 16, 2011

(30) Foreign Application Priority Data

May 8, 2009 (EP) .................................. 09251280
May 8, 2009 (GB) .................................. 0907899.9

(51) Int. Cl.
*G01S 13/44* (2006.01)
(52) U.S. Cl.
USPC ........................... 342/153; 342/149; 342/157
(58) Field of Classification Search
USPC ......................................... 342/149–154, 157
See application file for complete search history.

(56) References Cited

U.S. PATENT DOCUMENTS

| 4,160,975 A | 7/1979 | Steudel |
| 4,380,765 A | 4/1983 | Godfrey et al. |
| 4,438,436 A | 3/1984 | Murphy |
| 5,017,929 A | 5/1991 | Tsuda |
| 5,606,324 A | 2/1997 | Justice et al. |
| 6,195,035 B1 * | 2/2001 | Wood .............................. 342/80 |
| 6,320,541 B1 | 11/2001 | Pozgay et al. |
| 2003/0156060 A1 | 8/2003 | Revankar et al. |

FOREIGN PATENT DOCUMENTS

| DE | 3525778 A1 | 3/1986 |
| GB | 1605163 A | 8/1982 |

OTHER PUBLICATIONS

Office Action issued by the U.S. Patent and Trademark Office in the U.S. Appl. No. 12/863,536, mailed Dec. 18, 2012, U.S. Patent and Trademark Office, Alexandria, VA. (9 pages).
International Search Report (PCT/ISA/210) issued on Aug. 5, 2010, by European Patent Office as the International Searching Authority for International Application No. PCT/GB2010/050742.
Written Opinion (PCT/ISA/237) issued on Aug. 5, 2010, by European Patent Office as the International Searching Authority for International Application No. PCT/GB2010/050742.
Great Britain Search Report dated Aug. 24, 2009 for GB0907899.9.
European Search Report dated Oct. 22, 2009 for EP09251280.

* cited by examiner

*Primary Examiner* — Matthew M Barker
(74) *Attorney, Agent, or Firm* — Buchanan Ingersoll & Rooney PC (57) ABSTRACT

A radar apparatus including a transmit/receive antenna having a plurality of channels, a comparator coupled to the antenna channels for providing receive signal sum and difference channels, a radar receiver, a coupler for coupling the sum and difference channels to the radar receiver, a radar transmitter for providing a signal to be transmitted, a coupler for coupling the transmitter to a cross-channel port of the comparator, and an adjuster for adjusting a phase length of at least one antenna channel so that when the apparatus is transmitting, the transmitted signals from the antenna channels have a specified relative phase relationship.

27 Claims, 5 Drawing Sheets

Fig.1.

PRIOR ART

Fig.2.

PRIOR ART

Fig.3. New Configuration for Comparator and Tx Stages

Fig. 4.
Receive State

Fig.5. Transmit State

RADAR APPARATUS

FIELD

The present invention relates to active radar apparatus, especially but not exclusively a monopulse radar and in particular to a monopulse radar for use in a missile seeker.

BACKGROUND

In a monopulse radar two, four or more separate channels transmit the same RF signal at the same time but receive ground return echoes independently. The feeds are typically horn antennas for mechanical dish antennas or individual sub-arrays for phased-array antennas. In a four channel system, each feed antenna is placed within a quadrant of the antenna. In a phase comparison (or combined amplitude and phase comparison) radar the beams from the four quadrants (A, B, C, D) are fed to a monopulse comparator where the sum and difference signals in azimuth and elevation are formed as follows:

$$\Sigma = A+B+C+D$$

$$\Delta_{az} = (A+B)-(C+D)$$

$$\Delta_{el} = (A+D)-(B+C)$$

The sum and difference components are fed to the receiver where they are demodulated and processed in a known manner to provide error signals to the missile guidance system.

Conventionally, the signal to be transmitted is fed to the sum channel of the comparator, divided by the comparator and supplied equally to the four antenna channels. A duplexer (transmit/receive switch or circulator and limiter) is provided in the sum channel to isolate the receiver from the transmitter whilst it is transmitting if damage to the receiver or loss of transmitter power is to be avoided. However such duplexers can cause difficulties in achieving phase and amplitude tracking between the sum and difference channels in the microwave receiver.

The present invention avoids the use of a duplexer in the sum channel.

According to the invention, there is provided a radar apparatus comprising a transmit/receive antenna having a plurality of channels, comparator means coupled to the antenna channels for providing received signal sum and difference channels at respective sum and difference ports, a radar receiver, means coupling the sum and difference ports to the radar receiver, a radar transmitter for providing a signal to be transmitted, means coupling the transmitter to a cross-channel port of the comparator means, and means for adjusting a phase length of at least one antenna channel between transmitting so that when the apparatus is transmitting, the transmitted signals from the antenna channels have a required relative phase relationship.

The adjusting means may be adapted to adjust the transmission phase length of said at least one channel relative to the transmission phase length of at least one other of said channels when the apparatus is transmitting.

In a preferred embodiment, the apparatus is a four-channel monopulse radar apparatus, the difference channels providing azimuth and elevation differences relative to a boresight of the antenna, the required phase relationship being that the transmitted signals are coherent.

However the invention is a principle applicable to larger array antennas, because the monopulse comparator is a subset of the more general Butler matrix.

The adjusting means may be adapted to switch the phase length of the at least one channel between a reception phase length and a transmission phase length depending on whether the apparatus is receiving or transmitting.

In a four-channel monopulse embodiment, two of the antenna channels may have a transmission phase length from the comparator to the antenna which is $\lambda/4$ longer than the corresponding transmission phase length of the other two channels, $\lambda$ being the wavelength of the transmitted signal. Each antenna channel may comprise amplifying means controllable to provide gain, preferably high gain (e.g. 10 dB) in the transmitting direction and negligible loss (e.g. 0.5 dB) in the receiving direction.

The adjusting means may by-pass a phase length associated with the amplifying means when the apparatus is receiving.

The amplifying means may comprise a hybrid junction having two input/output ports and two further ports, each of the further ports being coupled to a respective amplifier via a respective said phase length, the adjusting means being configured selectively to cause reflection of a signal through the hybrid junction from one of the input/output ports to the other when the apparatus is receiving.

Thus the adjusting means may comprise, in parallel with each amplifier and its phase length, a controllable resistance device having a first bias condition in which it constitutes an open circuit and a second bias condition in which it constitutes a short circuit and causes reflection of said signal through said hybrid junction from one of said input/output ports to the other, said first and second bias conditions corresponding to radar transmission and reception respectively.

Each said amplifier may be an IMPATT diode or other injection locked oscillator.

Each controllable resistance device may be a PIN diode.

Each amplifying means may be positioned within its antenna channel such that the total reverse transmitter leakage into the antenna channels which appears in the sum and difference channels is substantially nil. Thus the amplifying means in two of the antenna channels of a four-channel monopulse apparatus may be $\lambda/4$ closer to the antenna than the amplifying means of the other two channels.

A further aspect of the invention provides an amplifier/duplexer for an antenna channel of a radar apparatus, comprising a first hybrid junction having two input/output ports for connection into the antenna channel, and two further ports each connected to a parallel combination comprising a transmission signal amplifier and switching means switchable between a transmit condition in which an amplified signal for transmission is passed to the antenna channel and a receive condition in which a signal received in the antenna channel is applied to one of the input/output ports and reflected to the other input/output characterised by each amplifier being configured to receive the signal for transmission other than via the sum port of a comparator and by a phase length adjuster which is disposed in the path of the transmission signal so that the amplified signal for transmission has a required phase.

As noted above the phase adjuster may be an additional phase length (e.g. $\lambda/4$) between the switching means and the transmission signal amplifier.

DESCRIPTION OF THE DRAWINGS

The invention will be described merely by way of example with reference to the accompanying drawings, wherein.

DETAILED DESCRIPTION

Figure 1:
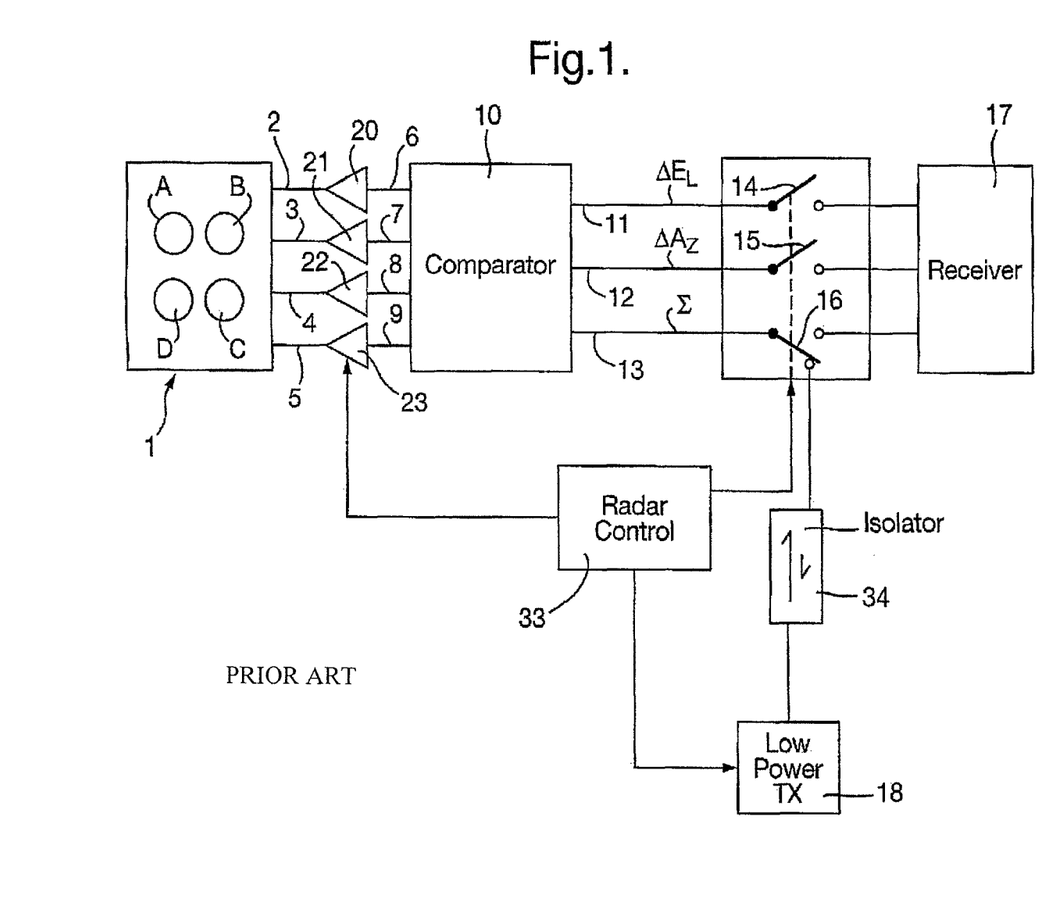
FIGS. 1 and 2 show a prior art radar apparatus.
Figure 2:
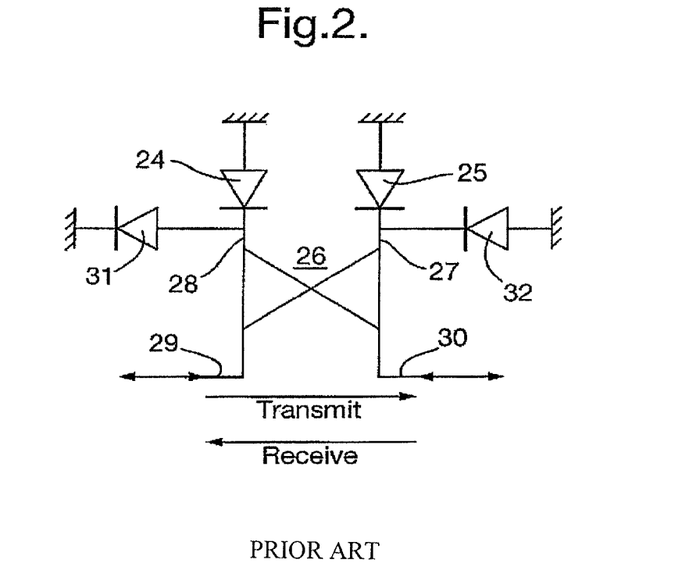

Referring to FIGS. 1 and 2, which are based on our earlier specification GB1605163A, an active pulse Doppler radar comprises a multi channel transmit/receive antenna system 1 having four elements A, B, C, and D respectively connected by individual antenna channels 2, 3, 4 and 5 to input terminals 6, 7, 8 and 9 of a comparator 10 in known manner. The comparator 10 is arranged to process signals received from the four antenna elements A, B, C and D and to provide an elevation difference signal $\Delta_{el}$ at an output terminal 11, an azimuth difference signal $\Delta_{az}$ at an output terminal 12 and a sum signal $\Sigma$ at an output terminal 13. The difference signals $\Delta_{el}$ and $\Delta_{az}$ and the sum signal $\Sigma$ are passed by way of respective blanking switches 14, 15 and 16 to a receiver 17.

The blanking switch 16 constitutes a changeover switch and is also arranged to connect a relatively low power transmitter driver stage 18 to the sum terminal 13 of the comparator 100 so that the individual elements A, B, C and D of the antenna system 1 may consequently be uniformly energised by way of the respective channels 2, 3, 4 and 5, their outputs being nominally coherent and combined in free space. Each of the channels 2, 3, 4 and 5 incorporates a respective individual output power amplifier/duplexer 20, 21, 22 and 23.

As shown in FIG. 2, each of the amplifiers 20-23 comprises a 3 dB quadrature hybrid junction 26, having input/output ports 29, 30 connected in the other antenna channel 2, 3, 4 or 5. The remaining two ports 27, 28 of the junction 26 each are terminated by a parallel combination comprising a negative resistance device 24, 25 (in particular an IMPATT diode) and a PIN diode 31. The IMPATT diodes 24 and 25 are injection locked oscillators which, at the transmission frequency of the radar act as amplifiers, their power being combined in the hybrid 26.

The overall pulsed operation of the system is controlled by control means 33 which makes the various changes at each transition between transmission and reception in known manner. Thus during transmission the blanking switches 14, 15 and 16 are controlled, the transmitter 18 is pulsed, and the amplifier/duplexers 20-23 have their IMPATT diodes suitably biased, the PIN diodes being at this time reverse biased and thus open-circuited. The signals from the transmitter 18 are applied to the input/output port 29, are incident upon the diodes 24 and 25, and are amplified and re-combined at the input/output port 30 of the hybrids 26 with some small losses due to the phase and amplitude imbalance in the hybrids 26 giving rise to reflection losses.

The amplifier/duplexers 20-23 can be expected to give a net power gain of substantially 10 dB each during transmission. They must however act as reciprocal (duplexing) devices permitting the passage of return signals during reception with only minimal (e.g. 0.5 dB) loss. To achieve this the ports 27, 28 are terminated during reception by a large mismatch. This is done by forward biasing the PIN diodes 31, 32 to short circuit the ports 27, 28 to ground. The IMPATT diodes can be un-biased or forward biased during reception because, due to the presence of the short circuit through the PIN diodes, their condition is unimportant, although they must not be transmitting (reverse biased). Each PIN diode has only to withstand the power from one of the IMPATT diodes 24, 25 when it is reverse-biased (off).

Figure 3:
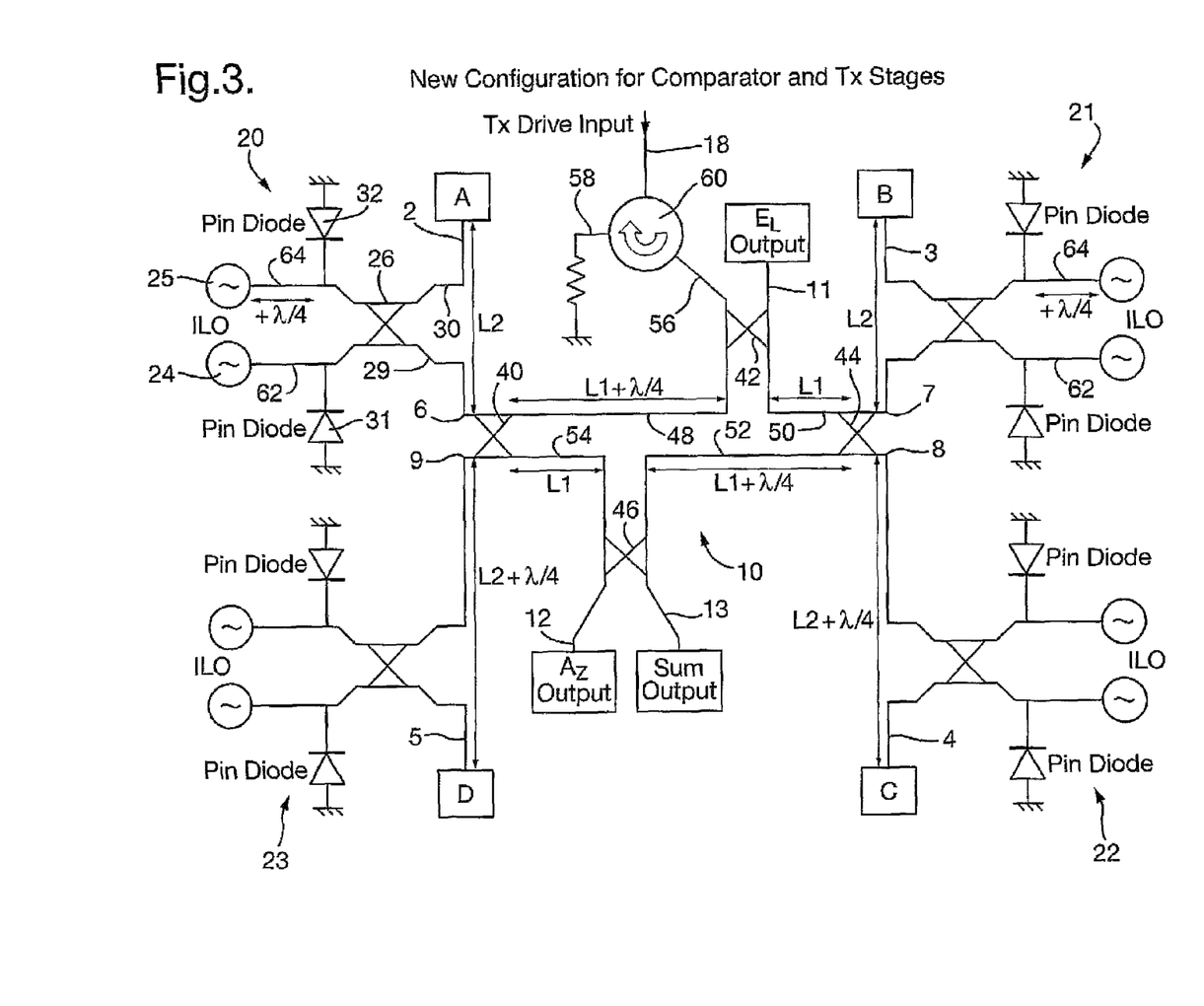
FIG. 3 shows a radar apparatus according to the invention.

In FIG. 3, which shows a radar according to the invention, features already described carrying the same reference numerals as in FIGS. 1 and 2. The comparator 10 is expanded to show its constituent parts, namely 90° hybrid couplers 40, 42, 44, 46 connected by internal lines 48, 50, 52, 54. It will be noted that, as is conventional, lines 48 and 52 are $\lambda/4$ longer than lines 50 and 54, and that antenna channels 4 and 5 to antenna elements C and D are $\lambda/4$ longer than channels 2 and 3 to antenna elements A and B, $\lambda$ being the wavelength of the transmitted signal. The comparator 10 can also be constructed with 0°, 180° hybrids (e.g. Magic-Tee), in which case the $\lambda/4$ additional lengths of lines 48 and 52 and of antenna channels 4 and 5 to antenna elements C and D are not required.

The invention differs from FIGS. 1 and 2 in that the transmitter 18 is connected not to the sum channel 13 of the comparator but to the normally-terminated cross-channel 56. The connection is via a circulator 60, the remaining port 58 of which is terminated at a suitably high impedance so as still to present a load when the comparator is dealing with received signals. Alternatively a T/R switch could be used instead of the circulator 60, because the power of the transmitter 18 is modest. The amplifier/duplexers 22 and 23 are as described with reference to FIG. 2, but amplifier/duplexers 20 and 21 have a phase adjuster in the form of an additional $\lambda/4$ phase length 62, 64 between the PIN diodes 31, 32 and the IMPATT diodes 24, 25. This compensates for phase differences between the signals issuing from the comparator 10 when the apparatus is transmitting, which arise due to the transmitter 18 being coupled to the cross-channel port 56. The additional $\lambda/4$ phase lengths are switched into the antenna channels 2, and 3 only when the PIN diodes 31, 32 are open circuited. When the PIN diodes are forward biased, the incoming received signals from the respective antenna elements are reflected before they reach the additional phase length.

It will be appreciated that the comparator 10 is in the conventional configuration for the receive state, since each of the amplifier modules 20, 23 is in the same state, with the pin diodes 31, 32 forward biased to provide short circuits at the same phase relative to each hybrid 26.

The path lengths between the hybrids 26, the PIN diodes 31, 32 and the IMPATT diodes 24, 25 in each of the amplifiers 20-23 should be accurately controlled in manufacture, because the relative positioning of the components is critical to isolation and insertion—loss performance.

Figure 4:
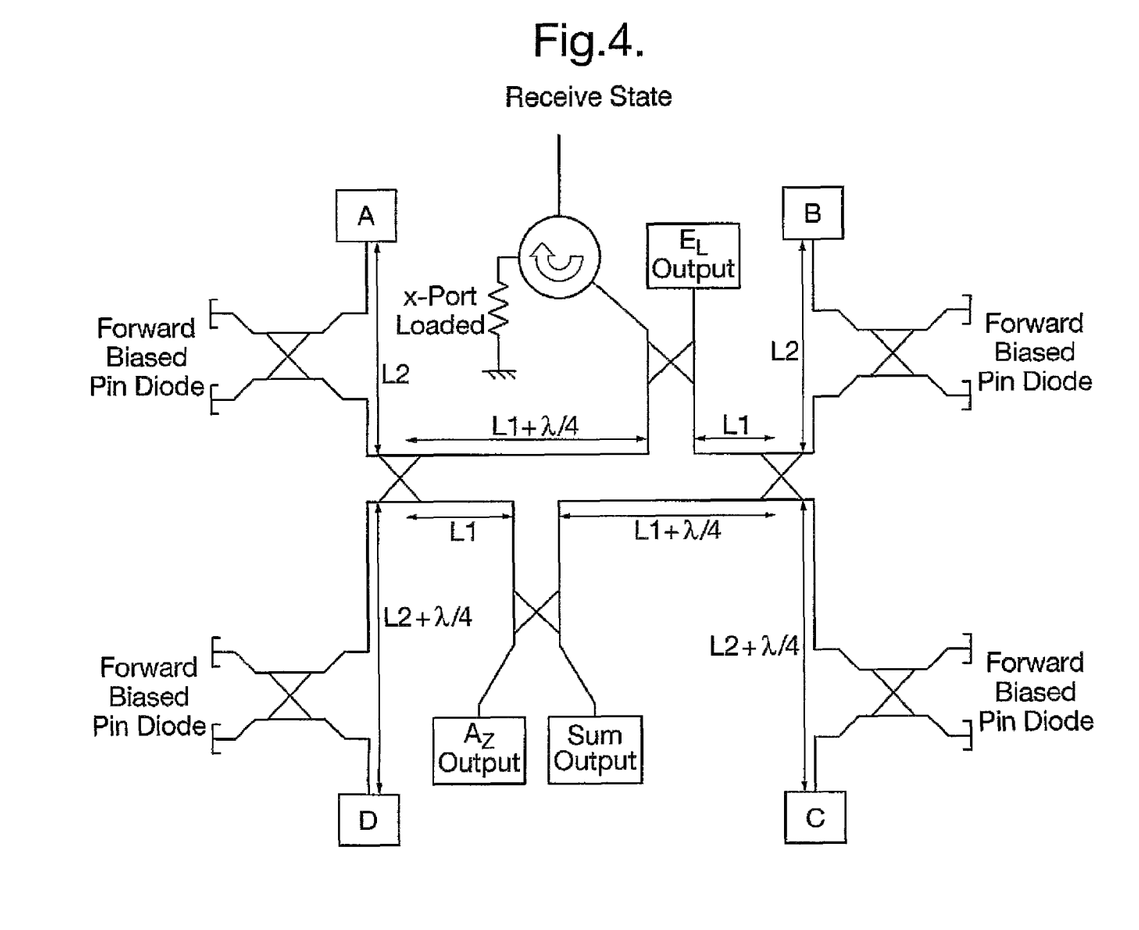
FIGS. 4 and 5 illustrate the operation of the apparatus of FIG. 3.

Referring to FIG. 4, which shows the apparatus in the receive state, at the Sum port the four antenna signals are:

| | |
|---|---|
| $L2-2j+L1-2j=L1+L2-4j$ | A |
| $L2-2j+(L1-j)-j=L1+L2-4j$ | B |
| $(L2-j)-j+(L1-j)-j=L1+L2-4j$ | C |
| $(L2-j)-j+L1-2j=L1+L2-4j$ | D | where—j represents a $\lambda/4(90°)$ phase change. Adjacent arms of the quadrature hybrids 40, 42, 44, 46 experience 90° phase-shift (−j) and the diagonally opposite arm experiences 180° phase-shift (−2j). There is no additional limitation on the bandwidth of this arrangement compared to the normal comparator configuration, although the hybrid and PIN diode present a small additional receive path loss.

Figure 5:
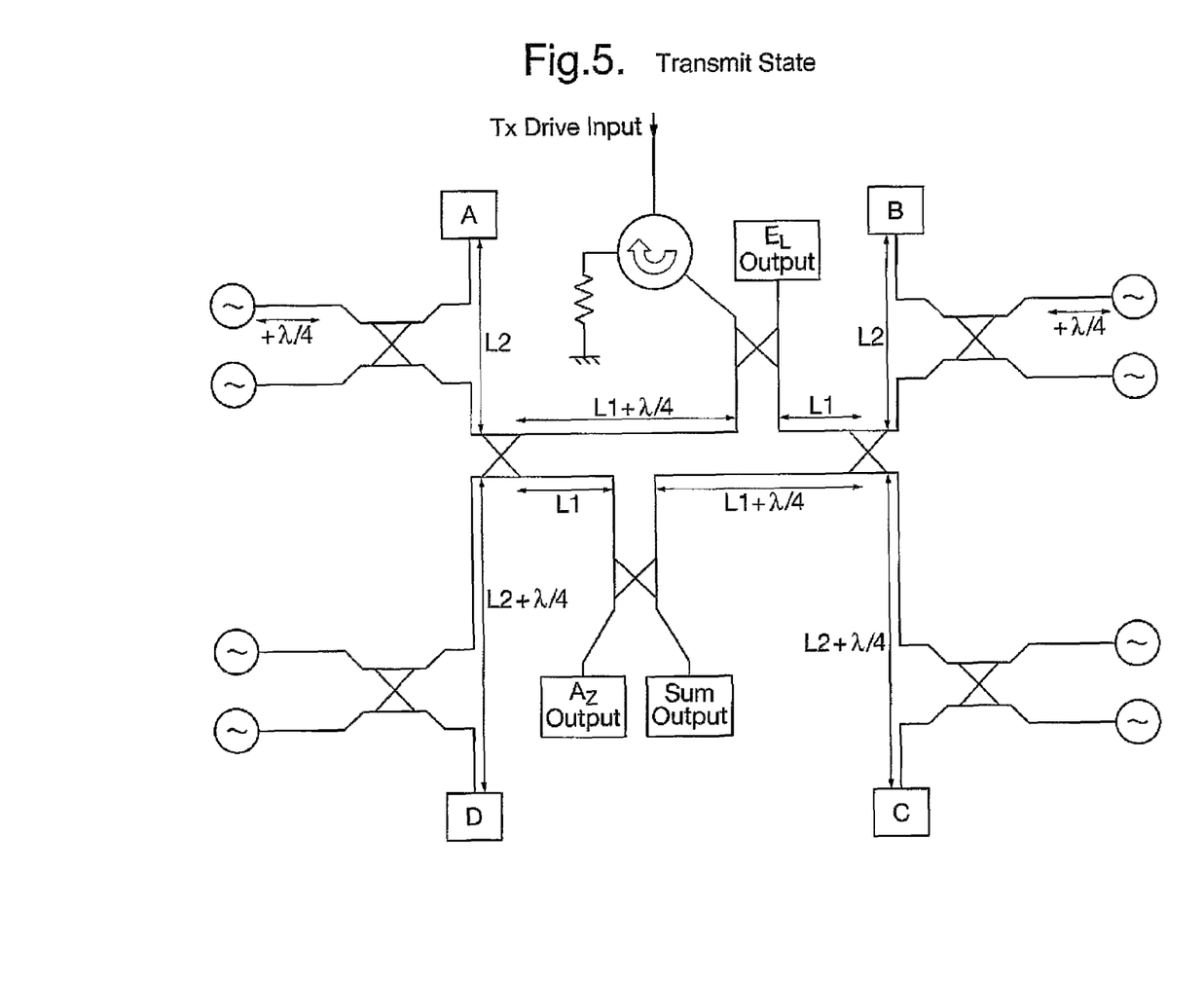

FIG. 5 shows the apparatus in the transmit state. Accounting for the additional $\lambda/4$ sections and the hybrid phase lengths; the relative phases of the transmitted signals at the antenna elements are:

At the antenna port A: $-j+(L1-j)-j-2j+L2=L1+L2-5j$

At the antenna port B: $-2j+L1-j-2j+L2=L1+L2-5j$

At the antenna port C: $-2j+L1-2j+(L2-j)=L1+L2-5j$

At the antenna port D: $-j+(L1-j)-2j+(L2-j)=L1+L2-5j$

In effect there is an additional $\lambda/4$ section compared to the receive state, and thus there may be a small reduction in the bandwidth for the transmit state if the extra phase shift does not match the hybrid phase slope. However, this will only manifest itself as a small reduction in free space combining efficiency towards the edge of the band.

For each antenna channel 2, 3, 4, 5 the reverse transmitter leakage (spill-over) into the Sum channel is equivalent to the isolation of the module hybrid 26 (about 20 dB) plus the cancellation achieved by the comparator 10, which may be a further 20 dB depending upon the phase and amplitude imbalance. The reduction in leakage can be optimised independently for each channel, because the location of each amplifier 20, 21, 22, 23 between the comparator 10 and the antenna can be adjusted individually. Only the total lengths of the antenna channels 2, 3, 4 and 5 are critical to the phase of the received and transmitted signals.

Several configurations are possible, giving varying levels of split-over cancellation at each of the comparator ports 11, 12 and 13.

If all the amplifiers 20-23 are located at the same distance from their respective antenna elements A, B, C, D, then the following phase shifts are present (the spill-over is assumed to be in-phase from each module, since it will be in quadrature with the antenna outputs which are all co-phased):

At the SUM channel from antenna port A: $L2-2j+L1-2j=L1+L2-4j$

At the SUM channel from antenna port B: $L2-2j+(L1-j)-j=L1+L2-4j$

At the SUM channel from antenna port C: $(L2-j)-j+(L1-j)-j=L1+L2-4j$

At the SUM channel from antenna port D: $(L2-j)-j+L1-2j=L1+L2-4j$

As a result, the spill-over is 6 dB up on the spill-over from a single module (i.e. about 14 dB with 20 dB isolation in a hybrid).

If two amplifiers (22 and 23) each are moved $\lambda/4$ closer to the comparator 10, then the following phase shifts are present:

At the SUM channel from antenna port A: $L2-2j+L1-2j=L1+L2-4j$

At the SUM channel from antenna port B: $L2-2j+(L1-j)-j=L1+L2-4j$

At the SUM channel from antenna port C: $(L2+j)-j+(L1-j)-j=L1+L2-2j$

At the SUM channel from antenna port D: $(L2+j)-j+L1-2j=L1+L2-2j$

The +j term arises from the removal of $\lambda/4$ in both the forward and reverse path of the signal to and from ports C and D. Thus complete spill-over cancellation is achievable, provided adequate phase matching can be attained.

The following phase shifts are present at Az and El ports:

At the Az channel from antenna port A: $L2-2j+L1-j=L1+L2-3j$

At the Az channel from antenna port B: $L2-2j+(L1-j)-2j=L1+L2-5j$

At the Az channel from antenna port C: $(L2+j)-j+(L1-j)-2j=L1+L2-3j$

At the Az channel from antenna port D: $(L2+j)-j+L1-j=L1+L2-j$

Thus the azimuth channel cancellation is also complete, the spill-over from the B channel lagging 360° on that from the D channel.

At the El channel from antenna port A: $L2-j+(L1-j)-2j=L1+L2-4j$

At the El channel from antenna port B: $L2-j+L1-j=L1+L2-2j$

At the El channel from antenna port C: $(L2+j)-2j+L1-j=L1+L2-2j$

At the El channel from antenna port D: $(L2+j)-2j+(L1-j)-2j=L1+L2-4j$

Thus the elevation channel cancellation is also complete.

Thus, in this embodiment, the isolation between the antenna channels when transmitting and the receiver sum channel is provided by both the normal hybrid isolation value and the cancellation effect of a quadrature hybrid to quadrature phase signals. The error channels have only the isolation contribution of a single hybrid.

Although as described the amplifiers 20-23 use IMPATT diodes as an injection locked oscillator, other forms of injection locked oscillator e.g. FET oscillators can be employed.

The antenna reflections arriving at each of the amplifiers 20-23 are coherent with the injected signals at the input to the respective hybrid 26 of the channel. Therefore the antenna should be configured so that the reflections are much lower in amplitude in order not to affect the injection locking performance. This is readily achievable using known principles for several types of antenna design. With an injection-locking gain of 10 dB, the return loss of the antenna must be at least 20 dB if it is not to cause a perturbation of the absolute phase of the amplifier that is dependent upon the phase of the mismatch. This could be up to 17.5° for the worst-case phase of the reflection coefficient (90°). It is however, only differences between the channels that are significant for transmission power combining efficiency. Mismatching does not reduce the total power generated, but because the signals are combined in free space, it results in a reduction of Effective Radiated Power (ERP) because of spreading of the beam (lower gain). Provided the antenna match to each of the four ports is very similar there will be little effect on the free-space combining loss.

Mismatching within the Tx stages 20, 21, 22 and 23 (whether it is in the hybrid 26 or an imbalance between the Impatt diodes) results in energy being coupled to all receiver ports of the comparator. Hence the blanking switches 14-16 of FIG. 1 should still be provided. However in the described embodiment they only need to withstand significantly lower power than if the full transmitter power were to be coupled via the cross-channel 56.

Failure of one of the pairs of IMPATT diodes 24, 25 is a soft failure, in that there will continue to be an output from the other one of the pair. However, power from the remaining one of the pair will be split between the antenna and whatever termination is presented by the receiver blanking. Additionally, there will be a loss of effective radiated power because the free-space combining will result in a spread of the beam (loss of gain) due to the imbalance between the quadrants. If continued but degraded operation is required, then the receiver blanking (via switches 14-16 of FIG. 1) needs to be absorptive to reduce re-reflection within the feed network into the transmit stages. Such reflection would be at an arbitrary phase with consequent indeterminate injection locked behaviour. The reflected power to be absorbed when one IMPATT diode fails is one sixteenth of the total power output of the transmitter.

The preferred embodiments of the invention could be well suited to a millimetric active system. The high-power circulators and isolators that are required for these wavelengths are usually quite large in comparison to other components. PIN diodes for T/R switches tend to be lower power if fast switching is required. The preferred embodiments of the invention use neither of these components in critical positions for either performance or space-envelope. There are no active components required in the transmit output path. This not only avoids the need for components to withstand high power, but also can reduce the transmission losses.

Another significant feature of this preferred embodiment is the distributed nature of the transmitter signal amplification function. One of the most difficult requirements to achieve in the RF receiver is the tolerance to high power RF signals. Current receiver designs with switched attenuators and limiters in the Sum and Difference channels cannot provide the power-handling required. Because of the distributed amplification in this embodiment a very significant increase in power-handling can be achieved for the same component (PIN diode) capability. Furthermore, because the comparator does not need to handle the full transmitter power, it can be a printed array rather than a waveguide component.

That said, the full transmitter power can be applied through the cross-channel port 56 if desired. Then the ILO amplifiers 24, 25 are omitted from antenna channels 2, 3, 4, 5 and are replaced instead by reflective terminations (fixed short circuits). The $\lambda/4$ sections 62, 64 in channels 2 and 3 are retained. The PIN diodes 31, 32 in each channel switch between transmit and receive status as already described and thus in the case of channels 2 and 3 effectively switch the additional $\lambda/4$ phase lengths in and out of the channel for transmitting and receiving respectively. This configuration is a distributed switched duplexer, in which the transmit power is shared between several switch elements therefore not requiring high power components.

The reader is referred to our related application reference GB0907900 (XA3285) "Radar Apparatus with Amplifier Duplexer" filed 8 May 2009. The disclosure of that application is included herein by reference.

The invention claimed is:

1. A radar apparatus comprising:
   a transmit/receive antenna having a plurality of antenna channels;
   comparator means coupled to the antenna channels for providing received signal sum and difference channels at respective sum and difference ports;
   a radar receiver;
   means coupling the sum and difference ports to the radar receiver;
   a radar transmitter for providing a signal to be transmitted;
   means coupling the transmitter to a cross-channel port of the comparator means; and
   means for adjusting a phase length of at least one antenna channel between transmitting and receiving so that when the apparatus is transmitting, transmitted signals from the antenna channels have a specified relative phase relationship.

2. The apparatus as in claim 1, wherein said adjusting means is adapted to adjust the transmission phase length of said at least one channel relative to the transmission phase length of at least one other of said channels when the apparatus is transmitting.

3. The apparatus as in claim 1, being a four-channel monopulse radar apparatus, the difference channels providing azimuth and elevation differences relative to a boresight of the antenna, the specified phase relationship being that the transmitted signals are coherent.

4. The apparatus as in claim 1, wherein the transmitter is coupled to the cross-channel port via a circulator or T/R switch.

5. The apparatus as in claim 1, wherein the adjusting means is adapted to switch the phase length of the at least one channel between a reception phase length and a transmission phase length depending on whether the apparatus is receiving or transmitting.

6. The apparatus as in claim 1, wherein two of the plurality of antenna channels have a transmission phase length from the comparator to the antenna which is $\lambda/4$ longer than a corresponding transmission phase length of another two of the plurality of antenna channels, $\lambda$ being the wavelength of the transmitted signal.

7. The apparatus as in claim 1, wherein each antenna channel comprises amplifying means controllable to provide gain in a transmitting direction and negligible loss in a receiving direction.

8. The apparatus as in claim 7, wherein the adjusting means by-passes a phase length associated with the amplifying means when the apparatus is receiving.

9. The apparatus as in claim 8, wherein the amplifying means comprises a hybrid junction having two input/output ports and two further ports, each of the further ports being coupled to a respective amplifier via a respective said phase length, the adjusting means being configured selectively to cause reflection of a signal through the hybrid junction from one of the input/out ports to the other when the apparatus is receiving.

10. The apparatus as in claim 9, wherein the adjusting means comprises, in parallel with each amplifier and its phase length, a controllable resistance device having a first bias condition in which it constitutes an open circuit and a second bias condition in which it constitutes a short circuit and causes reflection of said signal through said hybrid junction from one of said input/output ports to the other, said first and second bias conditions corresponding to radar transmission and reception respectively.

11. The apparatus as in claim 10, wherein each amplifier is an IMPATT diode or other injection-locked oscillator.

12. The apparatus as in claim 10, wherein each said controllable resistance device is a PIN diode.

13. The apparatus as in claim 7, wherein each amplifying means is positioned within its antenna channel such that total reverse transmitter leakage into the antenna channels which appears in the sum and difference channels is substantially nil.

14. The apparatus as in claim 13, wherein the amplifying means in two of the plurality of antenna channels are $\lambda/4$ closer to the comparator than the amplifying means in another two of the plurality of antenna channels.

15. A radar apparatus comprising:
   a transmit/receive antenna having a plurality of antenna channels;
   a comparator coupled to the antenna channels for providing received signal sum and difference channels at respective sum and difference ports;
   a radar receiver;
   circuitry for coupling the sum and difference ports to the radar receiver;
   a radar transmitter for providing a signal to be transmitted;
   circuitry for coupling the transmitter to a cross-channel port of the comparator; and
   an electronic switch for adjusting a phase length of at least one antenna channel only when transmitting so that when the apparatus is transmitting, the transmitted signals from the antenna channels have a specified relative phase relationship.

16. The apparatus as in claim 15, being a four-channel monopulse radar apparatus, the difference channels providing azimuth and elevation differences relative to a boresight of the antenna, the specified phase relationship being that the transmitted signals are coherent.

17. The apparatus as in claim 15, wherein the transmitter is coupled to the cross-channel port via a circulator or T/R switch.

18. The apparatus as in claim 15, wherein the electronic switch is adapted to switch the phase length of the at least one channel between a reception phase length and a transmission phase length depending on whether the apparatus is receiving or transmitting.

19. The apparatus as in claim 15, wherein two of the plurality of antenna channels have a transmission phase length from the comparator to the antenna which is $\lambda/4$ longer than a corresponding transmission phase length of another two of the plurality of antenna channels, $\lambda$ being the wavelength of the transmitted signal.

20. The apparatus as in claim 15, wherein each antenna channel comprises amplifying means controllable to provide gain in a transmitting direction and negligible loss in a receiving direction.

21. The apparatus as in claim 20, wherein the electronic switch by-passes a phase length associated with the amplifying means when the apparatus is receiving.

22. The apparatus as in claim 21, wherein the amplifying means comprises a hybrid junction having two input/output ports and two further ports, each of the further ports being coupled to a respective amplifier via a respective said phase length, the electronic switch being configured selectively to cause reflection of a signal through the hybrid junction from one of the input/out ports to the other when the apparatus is receiving.

23. The apparatus as in claim 22, wherein the electronic switch comprises, in parallel with each amplifier and its phase length, a controllable resistance device having a first bias condition in which it constitutes an open circuit and a second bias condition in which it constitutes a short circuit and causes reflection of said signal through said hybrid junction from one of said input/output ports to the other, said first and second bias conditions corresponding to radar transmission and reception respectively.

24. The apparatus as in claim 23, wherein each amplifier is an IMPATT diode or other injection-locked oscillator.

25. The apparatus as in claim 23, wherein each said controllable resistance device is a PIN diode.

26. The apparatus as in claim 20, wherein each amplifying means is positioned within its antenna channel such that total reverse transmitter leakage into the antenna channels which appears in the sum and difference channels is substantially nil.

27. The apparatus as in claim 26, wherein the amplifying means in two of the antenna channels are $\lambda/4$ closer to the comparator than the amplifying means in another two of the plurality of antenna channels.

* * * * *